(12) United States Patent
Peng et al.

(10) Patent No.: US 6,526,322 B1
(45) Date of Patent: Feb. 25, 2003

(54) SHARED MEMORY ARCHITECTURE IN GPS SIGNAL PROCESSING

(75) Inventors: Leon Kuo-Liang Peng, Mountain View, CA (US); Henry D. Falk, Long Beach, CA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

(21) Appl. No.: 09/465,985

(22) Filed: Dec. 16, 1999

(51) Int. Cl.$^7$ .......................... G05B 19/42; G01C 21/02
(52) U.S. Cl. ............... 700/5; 701/213; 711/148
(58) Field of Search ............... 700/2, 4, 5; 342/357.01, 342/357.05, 357.06, 357.07, 357.12; 711/147, 148; 701/213–215

(56) References Cited

U.S. PATENT DOCUMENTS

| | | | |
|---|---|---|---|
| 4,426,712 A | 1/1984 | Gorski-Popiel | 375/343 |
| 4,445,118 A | 4/1984 | Taylor et al. | 342/357.09 |
| 4,463,357 A | 7/1984 | MacDoran | 342/460 |
| 4,578,678 A | 3/1986 | Hurd | 342/357.12 |
| 4,667,203 A | 5/1987 | Counselman, III | 342/357.06 |
| 4,701,934 A | 10/1987 | Jasper | 375/147 |
| 4,754,465 A | 6/1988 | Trimble | 375/376 |
| 4,785,463 A | 11/1988 | Jane et al. | 375/147 |
| 4,809,005 A | 2/1989 | Counselman, III | 342/352 |
| 4,821,294 A | 4/1989 | Thomas, Jr. | 375/343 |
| 4,884,041 A | 11/1989 | Walker | 331/57 |
| 4,890,233 A | 12/1989 | Ando et al. | 701/224 |
| 4,894,662 A | 1/1990 | Counselman | 342/357.15 |
| 4,998,111 A | 3/1991 | Ma et al. | 342/352 |
| 5,014,066 A | 5/1991 | Counselman, III | 342/352 |
| 5,036,329 A | 7/1991 | Ando | 342/357.12 |
| 5,043,736 A | 8/1991 | Darnell et al. | 342/357.1 |
| 5,108,334 A | 4/1992 | Eschenbach et al. | 455/314 |
| 5,172,076 A | 12/1992 | Brown | 331/57 |
| 5,202,829 A | 4/1993 | Geier | 701/215 |
| 5,225,842 A | 7/1993 | Brown et al. | 342/357.09 |
| 5,293,170 A | 3/1994 | Lorenz et al. | 342/352 |
| 5,311,195 A | 5/1994 | Mathis et al. | 342/357.14 |
| 5,323,164 A | 6/1994 | Endo | 342/357.15 |
| 5,343,209 A | 8/1994 | Sennott et al. | 342/357.02 |
| 5,345,244 A | 9/1994 | Gildea et al. | 342/357.12 |
| 5,347,536 A | 9/1994 | Meehan | 375/148 |

(List continued on next page.)

FOREIGN PATENT DOCUMENTS

| | | |
|---|---|---|
| EP | WO 90/11652 | 10/1990 |
| EP | 0511741 | 11/1993 |
| GB | 2115195 | 1/1983 |
| JP | 58-105632 | 6/1983 |
| JP | 7-36035 | 5/1986 |
| JP | 4-326079 | 11/1992 |

OTHER PUBLICATIONS

Mark Moeglein et al., document, "An Introduction to Snap Track™ Server–Aided GPS Technology", 11pp, (undated).
Mark Markoff, As Seen in *The New York Times*: Deals to Move Global Postitioning Technology Toward Everyday Use, Article, *The New York Times*, © 1998, 1pp.

*Primary Examiner*—Paul P. Gordon
(74) *Attorney, Agent, or Firm*—Thomas, Kayden, Horstemeyer & Risley, LLP

(57) ABSTRACT

A shared memory architecture for a GPS receiver, wherein a processing memory is shared among the different processing functions, such as the correlator signal processing, tracking processing, and other applications processing. The shared memory architecture within the GPS receiver provides the memory necessary for signal processing operations, such as the massively parallel processing, while conserving memory cost by re-using that same memory for other GPS and non-GPS applications. The shared memory architecture for a GPS receiver provided in accordance with the principles of this invention thereby significantly minimize the costly memory requirement often required of extremely fast signal acquisition of a GPS receiver.

10 Claims, 8 Drawing Sheets

U.S. PATENT DOCUMENTS

| | | | |
|---|---|---|---|
| 5,379,224 A | 1/1995 | Brown et al. ............... | 701/215 |
| 5,402,347 A | 3/1995 | McBurney et al. ......... | 701/213 |
| 5,402,441 A * | 3/1995 | Washizu et al. ............ | 375/208 |
| 5,416,712 A | 5/1995 | Geier et al. | |
| 5,418,538 A | 5/1995 | Lau | |
| 5,420,592 A | 5/1995 | Johnson | |
| 5,420,593 A | 5/1995 | Niles | |
| 5,440,313 A | 8/1995 | Osterdock et al. | |
| 5,450,344 A | 9/1995 | Woo et al. | |
| 5,489,878 A | 2/1996 | Gilbert | |
| 5,504,684 A | 4/1996 | Lau et al. | |
| 5,548,553 A | 8/1996 | Cooper et al. | |
| 5,592,173 A | 1/1997 | Lau et al. | |
| 5,623,414 A | 4/1997 | Misra | |
| 5,625,668 A | 4/1997 | Loomis et al. | |
| 5,635,879 A | 6/1997 | Sutardja et al. | |
| 5,663,734 A | 9/1997 | Krasner | |
| 5,663,735 A | 9/1997 | Eshenbach | |
| 5,764,184 A | 6/1998 | Hatch et al. | |
| 5,781,156 A | 7/1998 | Krasner | |
| 5,786,789 A | 7/1998 | Janky | |
| 5,796,662 A | 8/1998 | Kalter at al. | |
| 5,812,087 A | 9/1998 | Krasner | |
| 5,825,327 A | 10/1998 | Krasner | |
| 5,828,694 A | 10/1998 | Schipper | |
| 5,831,574 A | 11/1998 | Krasner | |
| 5,841,396 A | 11/1998 | Krasner | |
| 5,845,203 A | 12/1998 | LaDue | |
| 5,854,605 A | 12/1998 | Gildea | |
| 5,874,914 A | 2/1999 | Krasner | |
| 5,877,724 A | 3/1999 | Davis | |
| 5,877,725 A | 3/1999 | Kalfaus | |
| 5,883,594 A | 3/1999 | Lau | |
| 5,884,214 A | 3/1999 | Krasner | |
| 5,889,474 A | 3/1999 | LaDue | |
| 5,897,605 A | 4/1999 | Kohli et al. | |
| 5,901,171 A | 5/1999 | Kohli et al. | |
| 5,903,654 A | 5/1999 | Milton et al. | |
| 5,907,809 A | 5/1999 | Molnar et al. | |
| 5,917,383 A | 6/1999 | Tso et al. | |
| 5,917,444 A | 6/1999 | Loomis et al. | |
| 5,920,283 A | 7/1999 | Shaheen et al. | |
| 5,923,703 A | 7/1999 | Pon et al. | |
| 5,926,131 A | 7/1999 | Sakumoto et al. | |
| 5,936,572 A | 8/1999 | Loomis et al. | |
| 5,943,363 A | 8/1999 | Hanson et al. | |
| 5,945,944 A | 8/1999 | Krasner | |
| 5,963,582 A | 10/1999 | Stansell, Jr. | |
| 5,977,909 A | 11/1999 | Harrison et al. | |
| 5,982,324 A | 11/1999 | Watters et al. | |
| 5,983,109 A | 11/1999 | Montoya | |
| 5,987,016 A | 11/1999 | He | |
| 5,999,124 A | 12/1999 | Sheynblat | |
| 5,999,125 A | 12/1999 | Kurby | |
| 6,002,362 A | 12/1999 | Gudat | |
| 6,002,363 A | 12/1999 | Krasner | |
| 6,009,551 A | 12/1999 | Sheyblat | |
| 6,011,509 A | 1/2000 | Dutka | |
| 6,014,101 A | 1/2000 | Loomis | |
| 6,016,119 A | 1/2000 | Krasner | |
| 6,041,222 A | 2/2000 | Horton et al. | |
| 6,047,017 A | 4/2000 | Cahn et al. | |
| 6,052,081 A | 4/2000 | Krasner | |
| 6,061,018 A | 5/2000 | Sheyblat | |
| 6,064,336 A | 5/2000 | Krasner | |
| 6,104,338 A | 8/2000 | Krasner | |
| 6,104,340 A | 8/2000 | Krasner | |
| 6,107,960 A | 8/2000 | Krasner | |
| 6,111,540 A | 8/2000 | Krasner | |
| 6,131,067 A | 10/2000 | Girerd et al. | |
| 6,133,871 A | 10/2000 | Krasner | |
| 6,133,873 A | 10/2000 | Krasner | |
| 6,133,874 A | 10/2000 | Krasner | |
| 6,150,980 A | 11/2000 | Krasner | |
| 6,205,400 B1 * | 3/2001 | Lin ........................... | 701/214 |
| 6,211,822 B1 * | 4/2001 | Dougherty et al. .... | 342/357.12 |
| 6,278,404 B1 * | 8/2001 | Niles ......................... | 342/359 |
| 6,317,604 B1 * | 11/2001 | Kovach, Jr. et al. ........ | 455/456 |

* cited by examiner

FIG.6

| | | | MEMORY USAGE DURING TRACK AND REACQUISITION MODES | |
|---|---|---|---|---|
| | | | I ACCUM SAMPLE 0 | Q ACCUM SAMPLE 0 |
| | | | MULTIPATH/E-L SAMPLES STORAGE IN TRACK MODE | |
| | | | CPU CACHE TAG & DATA STORAGE AREA (OR CAN BE USED AS FAST LOCAL RAM STORAGE) | |

| MEMORY USAGE DURING ACQUISITION MODES | | | |
|---|---|---|---|
| I ACCUM SAMPLE 0 | Q ACCUM SAMPLE 0 | 0x000 | |
| | | 0x077 | |
| NOT USED | NOT USED | 0x078 | |
| | | 0x07f | |
| I ACCUM SAMPLE 1 | Q ACCUM SAMPLE 1 | 0x080 | |
| | | 0x0f7 | |
| NOT USED | NOT USED | 0x0f8 | |
| | | 0x0ff | |
| I ACCUM SAMPLE 2 | Q ACCUM SAMPLE 2 | 0x100 | |
| | | 0x177 | |
| NOT USED | NOT USED | 0x178 | |
| | | 0x17f | |
| I ACCUM SAMPLE 3 | Q ACCUM SAMPLE 3 | 0x180 | |
| | | 0x1f7 | |
| NOT USED | NOT USED | 0x1f8 | |
| | | 0x1ff | |

| TAP 0 | TAP 1 |
|---|---|
| TAP 2 | TAP 1 |
| TAP 4 | TAP 3 |
| | |
| TAP 238 | TAP 239 |

ACQUISITION MODE FOR IQSQRAM MEMORY MAP (759)

| 12 BITS ADDR | FUNCTION | # OF WORDS | DESCRIPTIONS |
|---|---|---|---|
| 0x000 - 0x77f | IQSQ ACCUM | 1920 | IQSQ NON-COHERENT ACCUMULATION DATA |
| 0x780 - 0x7ff | G1/G2 | 128 | G1/G2 LOOKUP TABLE |
| 0x800 - 0x87f | TRACK CH0 | 128 | TRACKING PROCESSING FOR CHANNEL 0 PARAMETERS |
| 0x880 - 0x8ff | SPARE | 128 | NOT USED |

FIG.8

TRACK/REACQUISITION MODE FOR IQSQRAM MEMORY MAP (859)

| 12 BITS ADDR | FUNCTION | # OF WORDS | DESCRIPTIONS |
|---|---|---|---|
| 0x000 - 0x0ef | IQSQ/IQ ACCUM | 240 | IQSQ NON-COHERENT ACCUMULATION DATA |
| 0x0f0 - 0x0ff | SPARE | 16 | NOT USED |
| 0x100 - 0x1ff | CONVOLUTION | 256 | CONVOLUTION DECODER PARAMETERS |
| 0x200 - 0x23f | CONVOLUTION | 64 | CONVOLUTION DECODER DATA |
| 0x240 - 0x27f | TRACKING | 64 | TRACKING PROCESSING DATA |
| 0x280 - 0x8ff | TRACKING | 1664 | TRACKING PROCESSING PARAMETERS AND DATA |

SHARED MEMORY ARCHITECTURE IN GPS SIGNAL PROCESSING

FIELD OF INVENTION

This invention relates to the field of GPS receivers.

BACKGROUND OF INVENTION

FIG. 1 illustrates a typical GPS radio receiver 10, while FIG. 2 provides a general flow chart illustrating the general operations of GPS receiver 10 such as a satellite signal acquisition, tracking, or re-acquisition, and navigational processing. As illustrated in the simplified block diagram of a typical GPS receiver 10 shown in FIG. 1, a signal processing block 20 is provided to perform satellite signal acquisition and processing on a digitized IF signal 19 received via receiver antenna 12. Signal processing block 20 typically performs a two-dimensional search for a satellite signal, in time (code phase) and frequency. To decrease the amount of time needed for GPS signal acquisition in time, and frequency domains, a massively parallel architecture is usually required for searching in parallel a large number of code positions and frequency uncertainties. In the code phase search, the required number of code positions is directly related to initial time uncertainty. A large number of corellators allows a quick, parallel search of many code positions. In the frequency search, a large number of frequency bins architecture speeds up searching multiple frequency uncertainties in parallel, thereby reducing the total time for search.

As illustrated in FIG. 1, signal processing 20 consists of three functional stages: a first stage consists of channel correlation signal processing 22 that compares (or correlates) digitized signal 19 with a locally generated code that attempts to replicate the P or C/A code generated by a satellite. The replica code searches a "space" that consists of the unique codes generated by the different satellites, the temporal position of the code being sent at any given time, and the Doppler frequency offset caused by the relative motion of the satellite and user. Generally, correlator signal processing unit 22 can perform parallel correlations with multiple code/position/doppler combinations simultaneously in a multiple channel fashion, usually up to 12. The next functional stage of signal processing 20 comprises tracking processing unit 24, typically provided by a tracking processing CPU. The tracking processing CPU uses correlator information from correlator signal processing unit 22 to ascertain the probability of correctness of a code/position/doppler combination and to "follow", or track, that signal once it is found. Tracking processing unit 24 includes having the tracking CPU program the correlator signal processing unit 22 where to search for a GPS satellite signal. Once a signal is found and locked onto, the tracking CPU also extracts the 50 Hz modulated data that contains navigation information transmitted by the GPS satellite. Finally, a navigation processing unit 26, comprising a navigation processing CPU, uses data collected by the correlator signal processing unit 22 and tracking processing unit 24 to perform the calculations to determine the user's position, velocity, and time.

In the typical GPS signal processing 20, an associated and dedicated memory unit is coupled to each functional unit stage. Thus, correlator signal processing unit 22 is typically coupled to an associated dedicated correlation processing memory unit 28 shown in FIG. 1. Coherent and non-coherent I & Q samples are stored in correlation processing memory 28 received from correlator signal processing unit 22. Tracking processing unit 24 is coupled to a tracking unit memory 30 to store the code, data, and parameters utilized by the tracking processor CPU for acquisition and tracking processing such as, for example, carrier loops, code loops, code lock detect, costas lock detect, bit synchronization, data demodulation. Navigation processing unit 26 is coupled to a navigation processing memory 32 for storing the code and data for the navigation processing CPU, such as calculation of position and time.

Thus, in operation, typical GPS receiver 10 requires significant hardware and memory to search, utilizing a large number of correlators and multiple frequency bins to implement. For example, an 8 frequency bin search should reduce the search time by a factor of 8 but it will require 4 times the memory to store the coherent integration samples and 8 times the memory to store the non-coherent integration samples. In order to achieve low cost, commercial GPS receiver architectures are deterred from using massively parallel architectures to avoid the cost of massively parallel implementation. There is therefore a need for a GPS signal processing architecture that minimizes the costly memory requirement and still achieves extremely fast signal acquisition.

SUMMARY OF INVENTION

A shared memory architecture for a GPS receiver is provided, wherein a processing memory is shared among the different processing functions, such as the correlator signal processing, tracking processing, and other applications processing. The shared memory architecture within the GPS receiver provides the memory necessary for signal processing operations, such as the massively parallel processing, while conserving memory cost by re-using that same memory for other GPS and non-GPS applications. The shared memory architecture for a GPS receiver provided in accordance with the principles of this invention thereby minimize the costly memory requirement often required of extremely fast signal acquisition of a GPS receiver.

BRIEF DESCRIPTION OF DRAWINGS

FIG. 6 is a block diagram describing a memory map for IQRAM for the channel correlator signal processing.

FIG. 7 is a block diagram describing a memory map for IQSQRAM in acquisition for the channel correlator signal processing.

FIG. 8 is a block diagram describing a memory map for IQSQRAM in tracking/reacquisition mode.

DETAILED DESCRIPTION OF PREFERRED EMBODIMENT(S)

Figure 1:
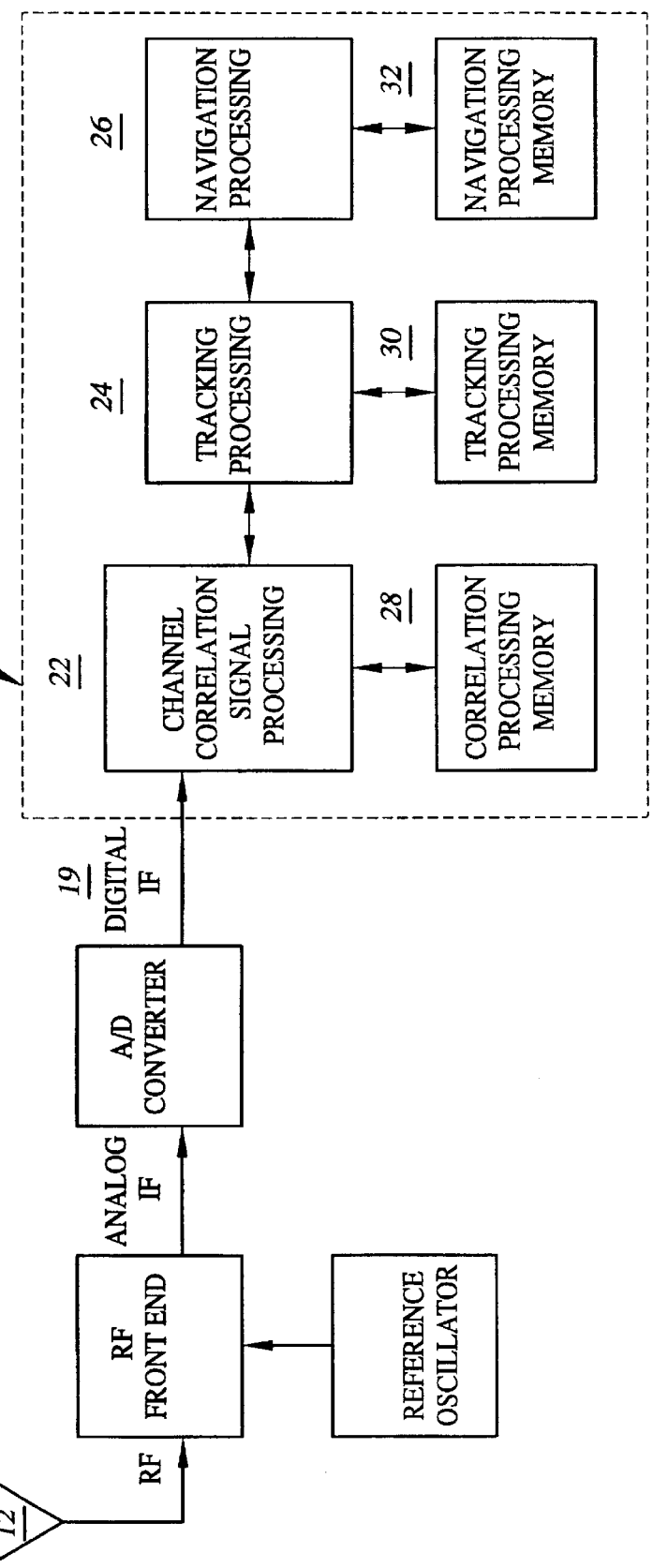
FIG. 1 is a block diagram describing a prior art GPS receiver.
Figure 2:
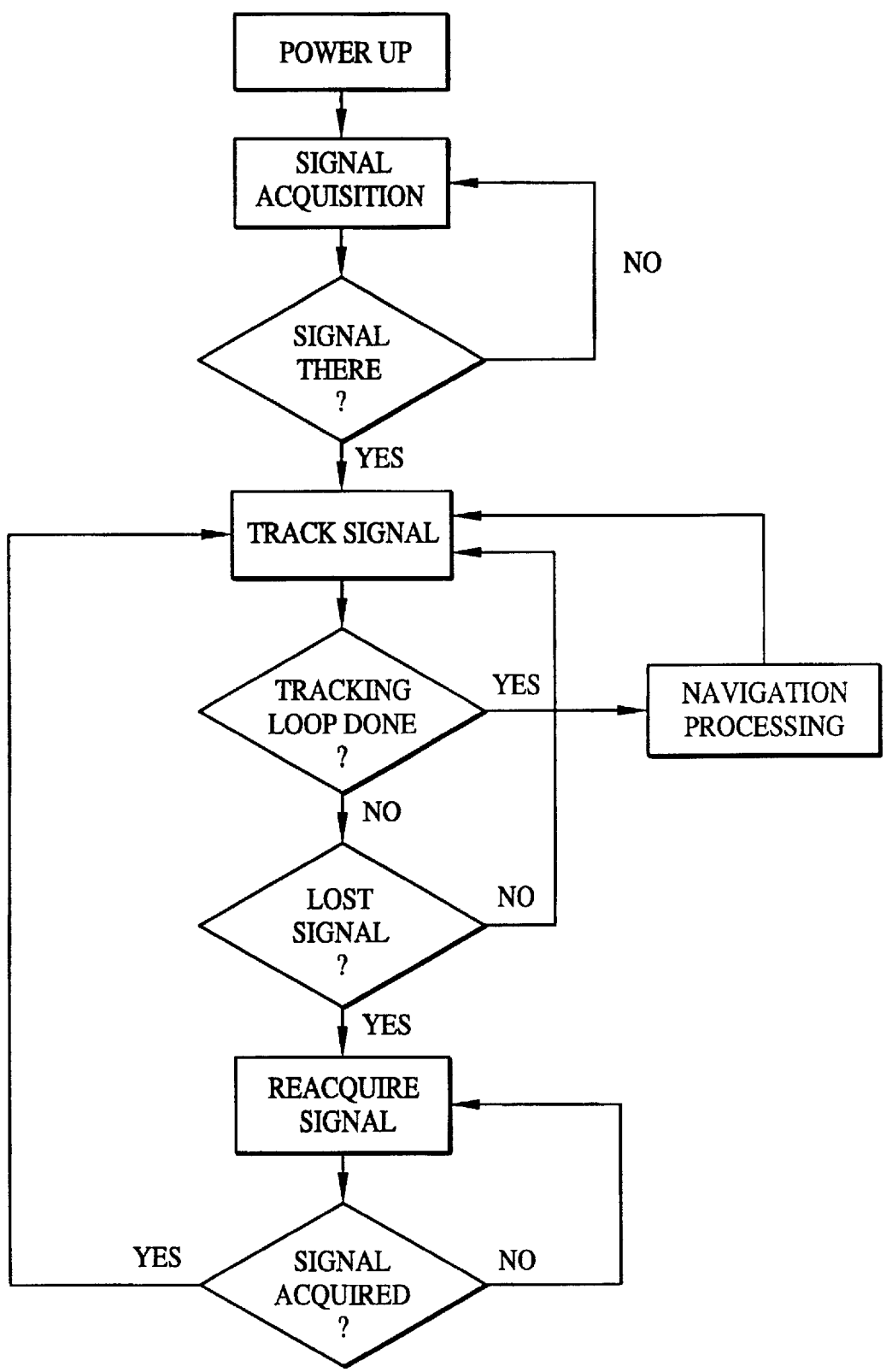
FIG. 2 is a flowchart describing the operation of a GPS receiver.
Figure 3:
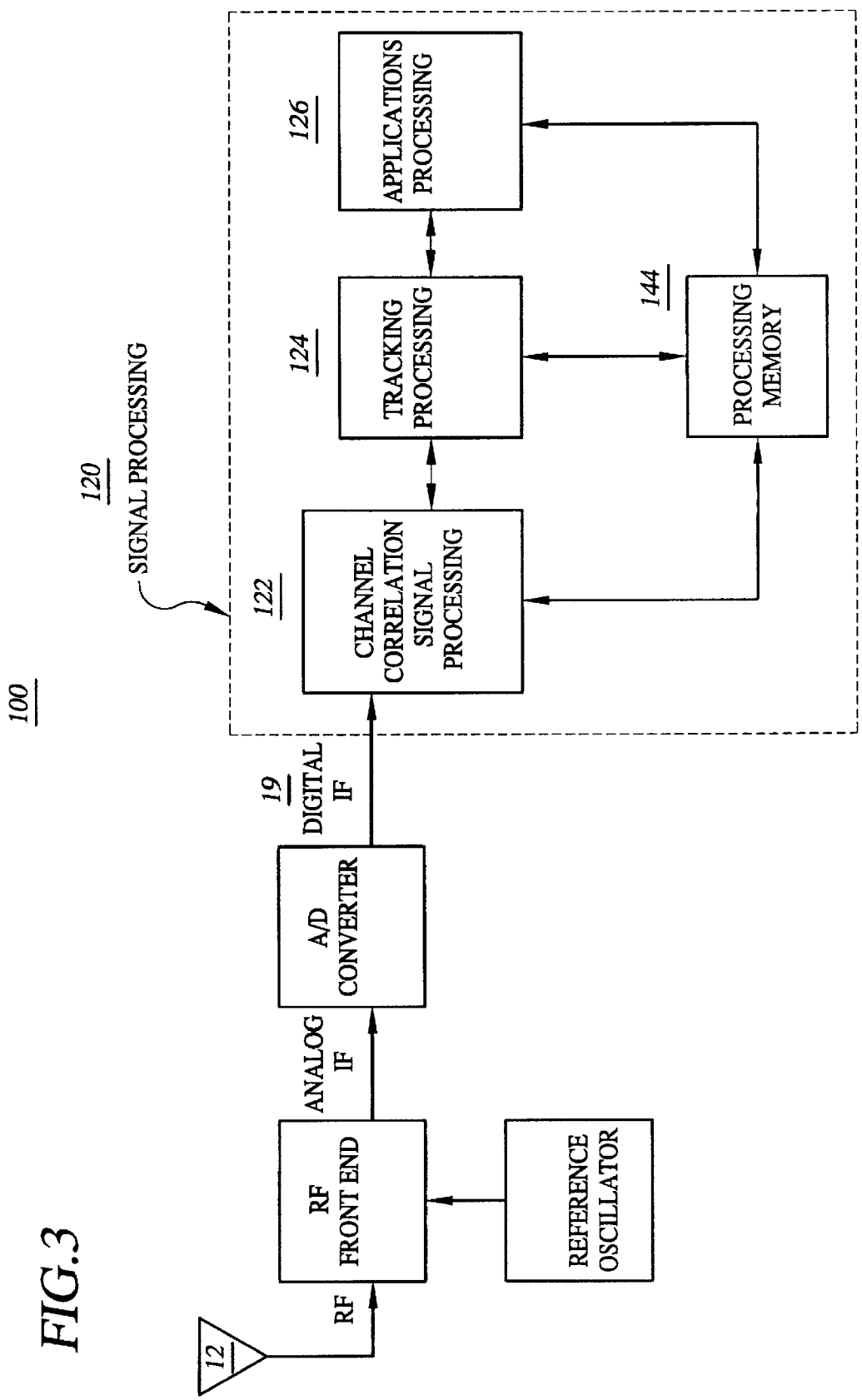
FIG. 3 is a block diagram describing the shared memory architecture of the invention.
Figure 4:
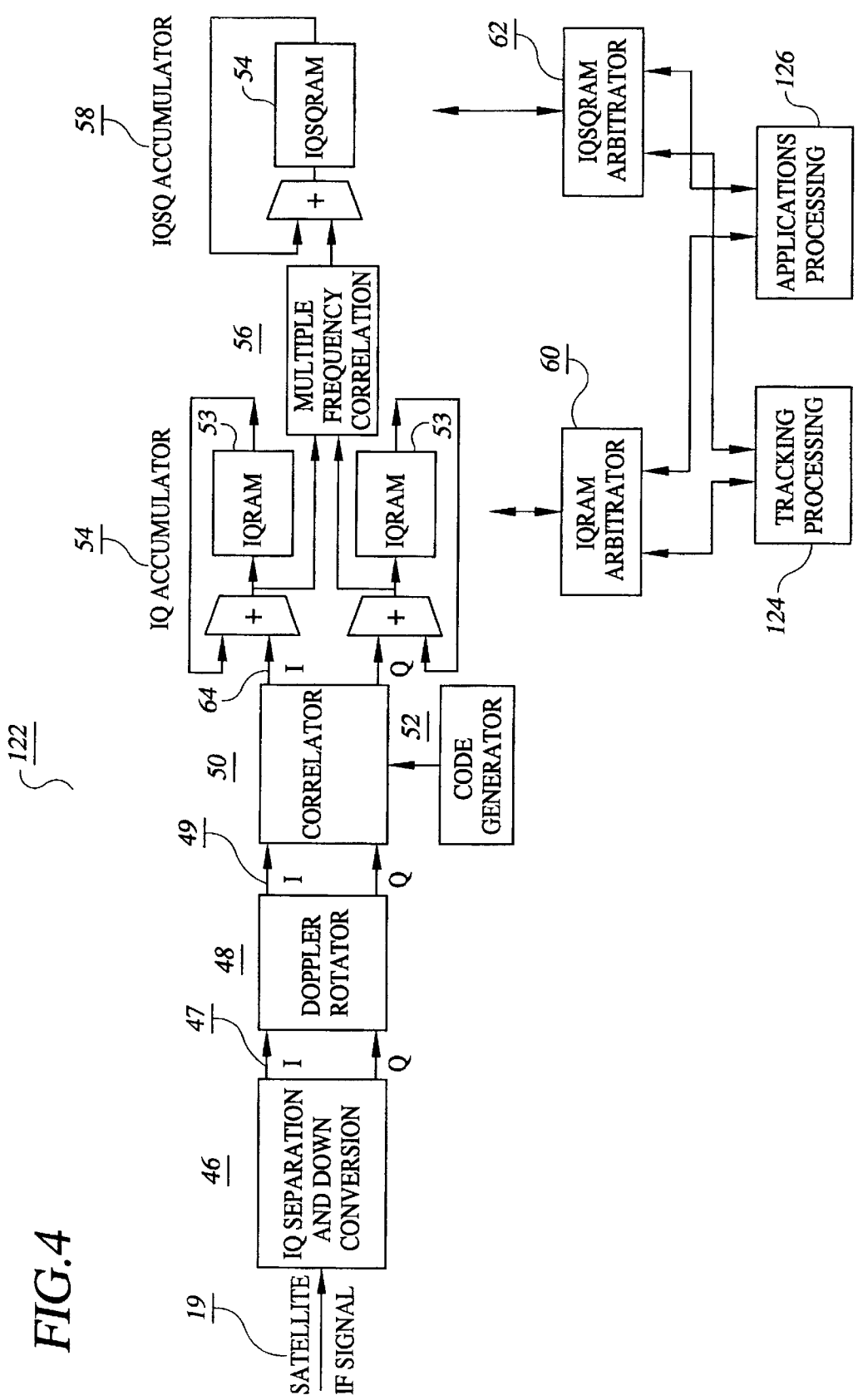
FIG. 4 is a block diagram describing the channel correlator signal processing.

FIG. 3 shows a shared memory architecture for a GPS receiver 100, wherein a signal processing memory 144 is shared among different signal processing functional units, such as a correlator signal processing unit 122, tracking processing unit 124 and applications processing unit 126. FIG. 4 shows a more detailed functional block diagram of processing memory 144 comprising an IQRAM 53 and an IQSQRAM 59. FIG. 4 further illustrates shared memory architecture in operation, as an illustration, such as during operations of channel correlator signal processing unit 122.

In operation, an IQ separator and down converter 46 samples a satellite IF signal 19 and separates signal 19 into a pair of I and Q signals 47. I and Q signal pair 47 is down converted to a baseband frequency before being provided to a Doppler rotator 48, which provides Doppler rotation of I and Q signal pair 47. Both carrier phase and carrier frequency are programmed in the Doppler rotator 48 by a tracking processing CPU of tracking processing unit 124 of FIG. 3. As shown in FIG. 4, correlator 50 receives the Doppler rotated I and Q signal pair 49 and correlates signal pair 49 with a replica I and Q code produced by a code generator 52. An IQ accumulator 54 receives both I and Q samples 64 from correlator 50 and accumulates the samples over a coherent integration period. The accumulated results are stored separately in an IQRAM 53. The multiple frequency bin correlator 56 then receives I and Q data provided from IQ accumulator 54 and performs an accumulation at IQSQ accumulator 58 on the results of the square root of the sum of I-squared plus Q-squared for a period of time specified as non-coherent integration. The accumulation results are then stored in an IQSQRAM memory 59 of processing memory 144.

Figure 5B:
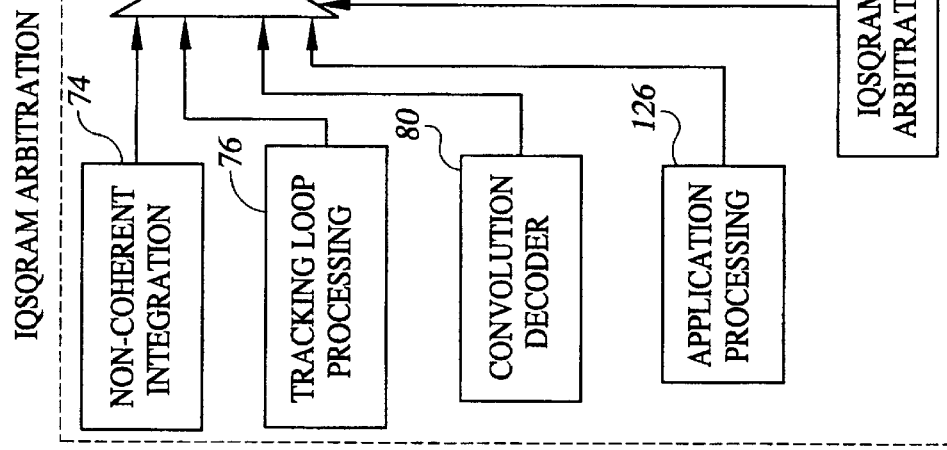
FIGS. 5A and 5B are block diagrams describing IQRAM and IQSQRAM arbitration in channel correlator signal processing.
Figure 5A:
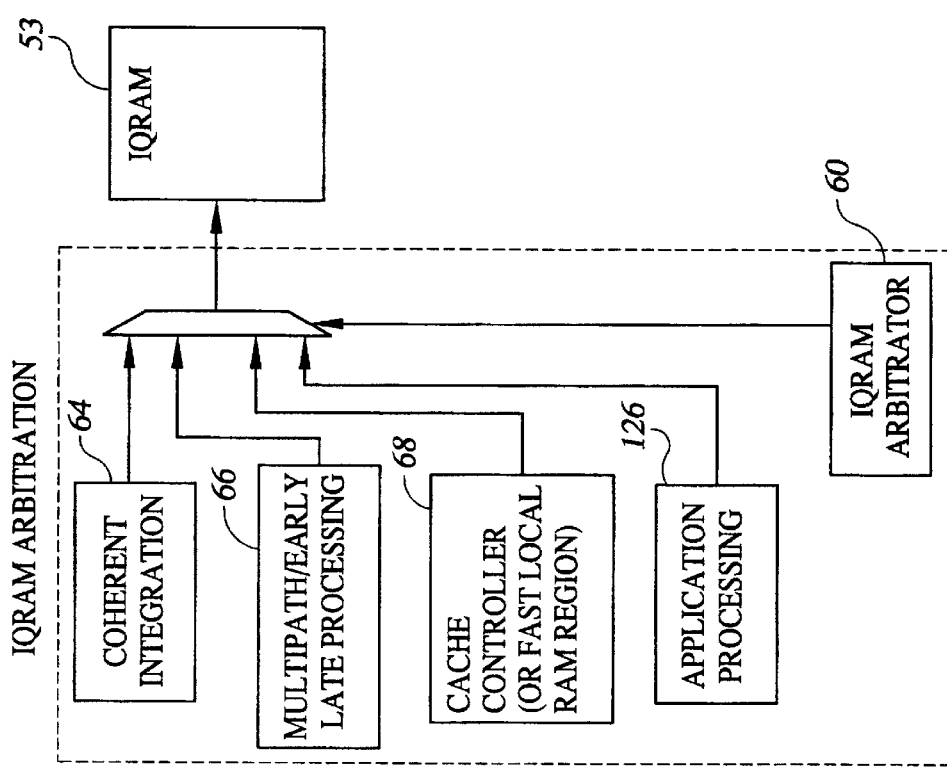

FIGS. 5A and 5B further illustrate a more detailed block diagram of an IQRAM arbitration (FIG. 5A) and an IQSQRAM arbitration (FIG. 5B) provided to arbitrate use of IQRAM 53 and IQSQRAM 59. FIGS. 5A-5B illustrate the IQRAM and IQSQRAM arbitrator 60 and 62 that control access to shared memory IQRAM 53 and IQSQRAM 59, i.e., such as arbitrating memory use between channel correlator signal processing unit 122 and the other functions seeking access to memory 144. For the IQRAM arbitrator 60, the multiple memory access sources comprise the coherent integration of I and Q data from the output of coherent integration function 64 of correlator signal processing unit 122, the multipath/early–late processing 66 (i.e., for sampling data used for multipath mitigation by the tracking processor), the cache tag and data from the cache controller 68 (i.e., used to speed, up memory accesses for all the signal processing, including tracking processing and navigation processing), and any application processing 126. In this example, during tracking, the IQRAM arbitrator 60 arbitrates the multiple sources seeking access to IQRAM 53. The IQSQRAM arbitrator 62 shown in FIG. 5B includes controlling access from the non-coherent integration of I and Q signals 74, access to parameters stored for the tracking loops 76, multiple frequency bin correlation 56 (FIG. 4), the convolution decoder 80 (used for a special differential GPS function), and any application processing functions 126. The arbitrator, such as the IQSQRAM arbitrator 62, arbitrates the multiple sources seeking access to the IQSQRAM 59.

Figure 9:
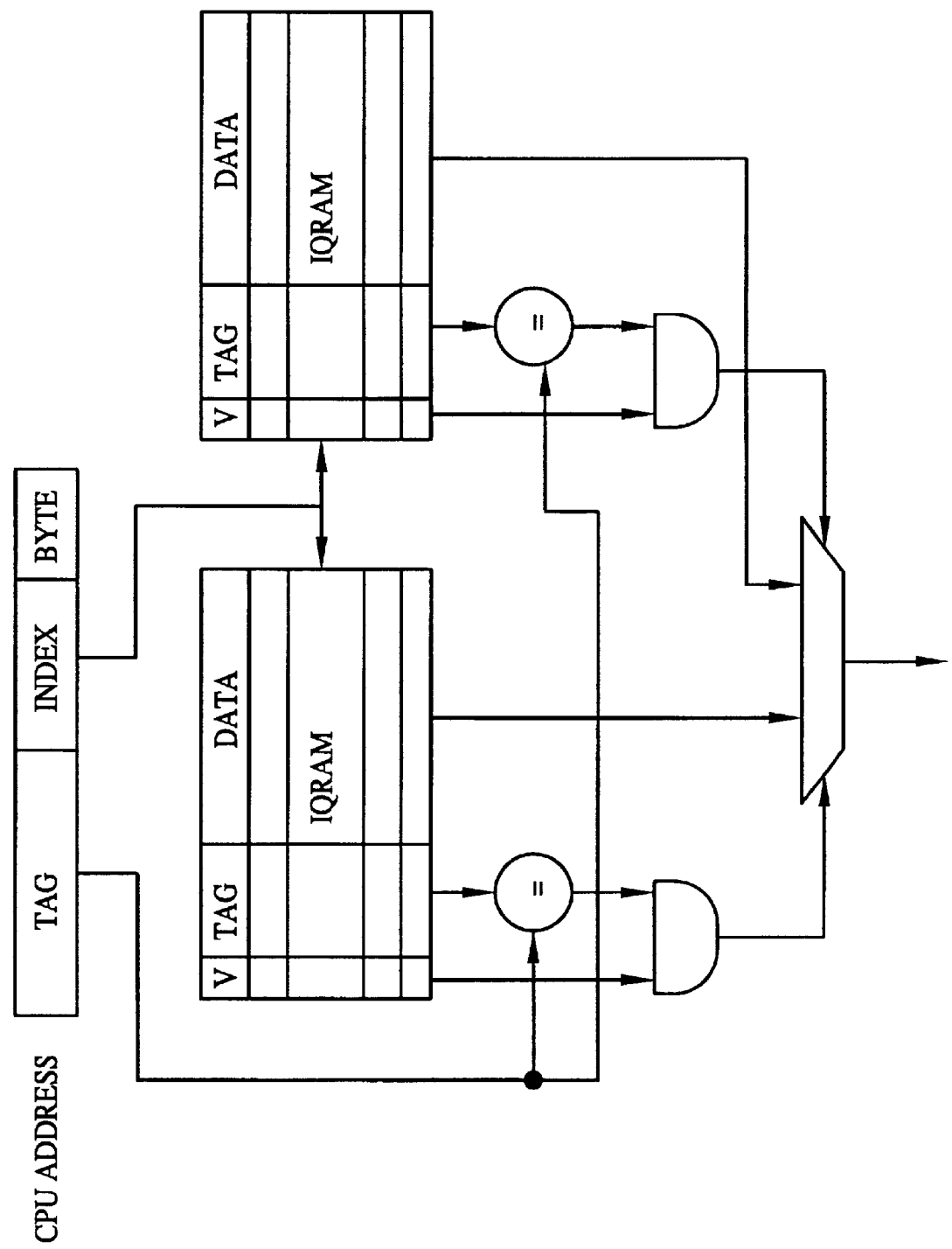
FIG. 9 is a block diagram describing an example of a two way set associative cache memory map for both tracking and navigation processing.

FIG. 6 shows an example of the memory map 653 of the IQRAM 53 during our tracking operation example. There are three different address ranges for three types of memory sources: the coherent integration of I and Q data from the correlator outputs (multiple samples in acquisition mode, single sample in track/re-acquisition mode), the multipath/early–late sample data, and the cache tag/data. For this example, in satellite acquisition mode the whole address space of 0x000 though 0x1f7 is used to store the multiple sample (in this case four) coherent integrations needed to search multiple frequency bins simultaneously. In track, or reacquisition modes, however, only a single sample needs to be collected instead of four. Thus, in track/reacquisition modes, the coherent integration I and Q data is stored only in the address range from 0x000 to 0x077. This frees up the remaining space to be used for other functions. The multipath/early-late sampling data is stored in the address rage from 0x080 to 0x0ff. The cache tag/data for tracking or navigation processing is stored in the range from 0x100 to 0x1ff. FIG. 9 shows a structure for a 2 way set associative cache implementation of processing memory 144. The cache can be used as the instruction and data cache for the tracking and navigation processing functions to speed them up. The memory region used as cache can alternatively be used as fast local RAM for data storage by the tracking processor or applications processor. Thus, same areas of the address map are shared by multiple functions, including other non-GPS applications, such as navigation processing, GPS location processing, wireless networking protocol processing, and other application processing that would be desirable to incorporate into GPS receiver 100.

FIG. 7 and FIG. 8 show the memory maps 759 and 859 for IQSQRAM 59 for other GPS functions, such as acquisition (or re-acquisition). The memory requirements once again are different for acquisition mode and track/reacquisition modes. In acquisition mode, 1920 words in address range of 0x000 to 0x77f are used to store noncoherent accumulations. In track/reacquisition modes, however only 240 words stored in address range 0x000 to 0x0ef are needed to store the noncoherent accumulations. This frees up the remaining space for other functions. In this example the other functions include convolutional decoder parameters and data, and expanded tracking processor parameters and data.

FIGS. 7–8 illustrate sample memory mapping for memory IQSQRAM 59 during different modes. The memory mapping of IQRAM 53 and IQSQRAM 59 of processing memory 144 as illustrated in FIGS. 6–8 is a sample implementation. It is understood that this shared memory mapping in GPS receiver 100 can be extended to process other applications performed by the GPS receiver, such as navigation processing, GPS location processing, processing wireless networking protocols, to just name a few. It should be understood that the shared memory architecture, such as illustrated with reference to FIGS. 3–9 can be applied to other GPS receiver applications contemplated as being within a GPS receiver. The shared memory architecture within the GPS receiver provides the memory necessary for signal processing operations, such as the massively parallel processing, while conserving memory cost by re-using that same memory for other GPS and non-GPS applications. The shared memory architecture for a GPS receiver provided in accordance with the principles of this invention thereby minimize the costly memory requirement often required of extremely fast signal acquisition of a GPS receiver.

Foregoing described embodiments of the invention are provided as illustrations and descriptions. They are not intended to limit the invention to precise form described. In particular, Applicant(s) contemplate that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by Claims following.

What is claimed is:

1. A shared memory architecture for a receiver system, comprising a memory space shared commonly by two or more receiver functions comprising correlator signal processing, tracking processing and application processing to minimize the memory space, wherein the commonly shared memory space functions as a coherent and a noncoherent integration memory for the correlation processing during signal correlation mode while the commonly shared memory space is also used for one or more other receiver processing functions during one or more other receiver operation modes.

2. The shared memory architecture of claim 1, wherein the commonly shared memory space comprises a first memory section used as the system memory for a fast local memory or system cache during tracking or application processing.

3. The shared memory architecture of claim 1, wherein the application processing comprises navigation processing.

4. The shared memory architecture of claim 1, wherein the application processing comprises GPS location processing.

5. The shared memory architecture of claim 1, wherein the application processing comprises wireless networking protocol processing.

6. A shared memory architecture for a receiver system comprising a memory space shared commonly by two or more receiver functions comprising correlator signal processing, tracking processing and application processing to minimize the memory space, wherein the commonly shared memory space comprises a first memory section and a second memory section, wherein the first memory section functions as a coherent and the second memory section as a noncoherent integration memory for a correlation processing during signal correlation mode while the shared memory space is also used for one or more other receiver processing functions during one or more other receiver operation modes.

7. The shared memory architecture of claim 6, wherein the commonly shared memory space comprises a first memory section used as the system memory for a fast local memory or system cache during tracking or application processing.

8. The shared memory architecture of claim 6, wherein the application processing comprises navigation processing.

9. The shared memory architecture of claim 6, wherein the application processing comprises GPS location processing.

10. The shared memory architecture of claim 6, wherein the application processing comprises wireless networking protocol processing.

* * * * *